June 19, 1951 F. L. MURPHY ET AL 2,557,885
CONVERTIBLE RECREATION-LOUNGE VEHICLE
Filed Jan. 14, 1946 4 Sheets-Sheet 1
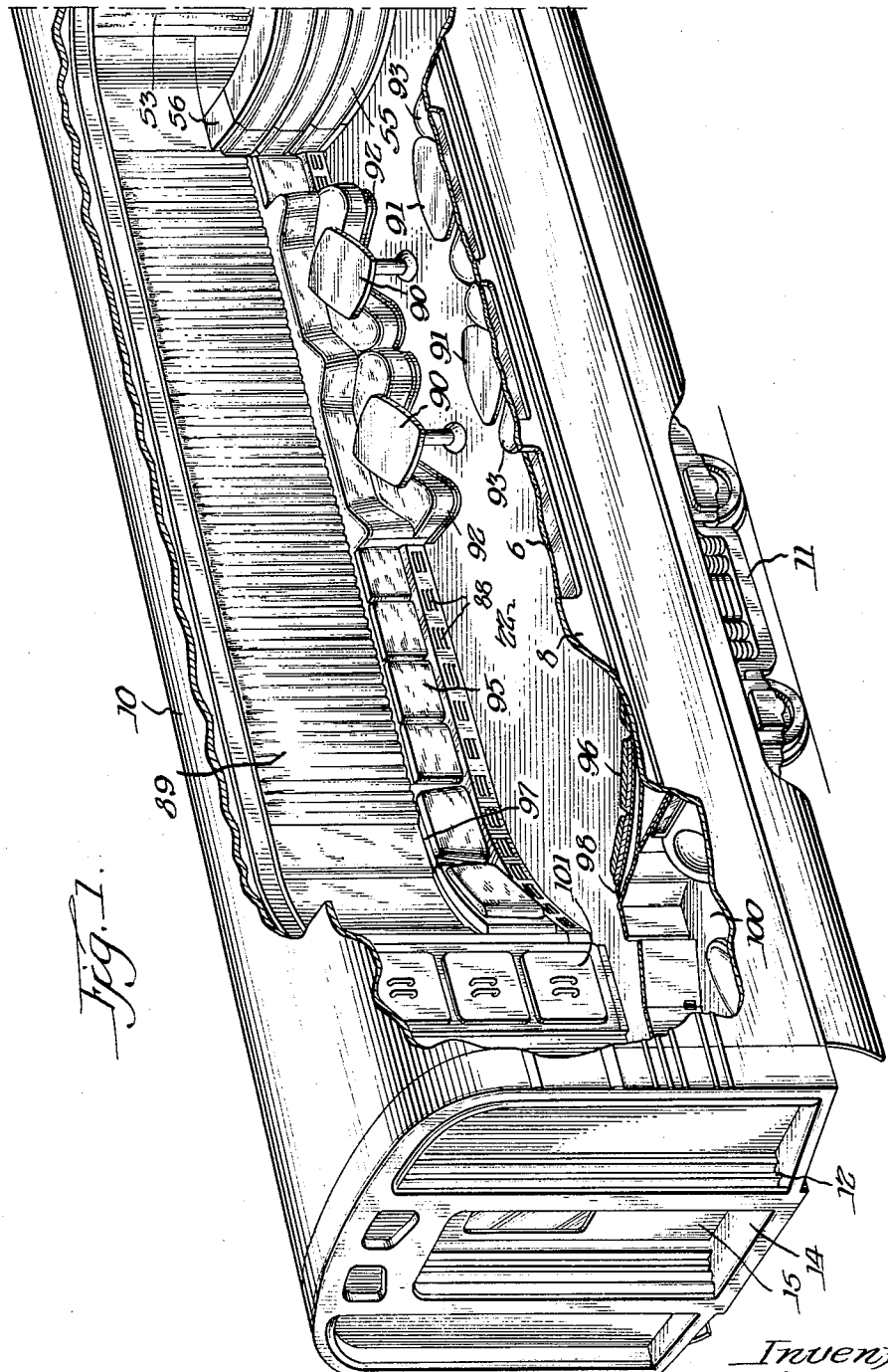
Inventors:
Frank L. Murphy,
Ralph W. Haman, &
Stanley W. Kay.
By Oscar Hochberg, Atty.

June 19, 1951   F. L. MURPHY ET AL   2,557,885
CONVERTIBLE RECREATION-LOUNGE VEHICLE
Filed Jan. 14, 1946   4 Sheets-Sheet 2
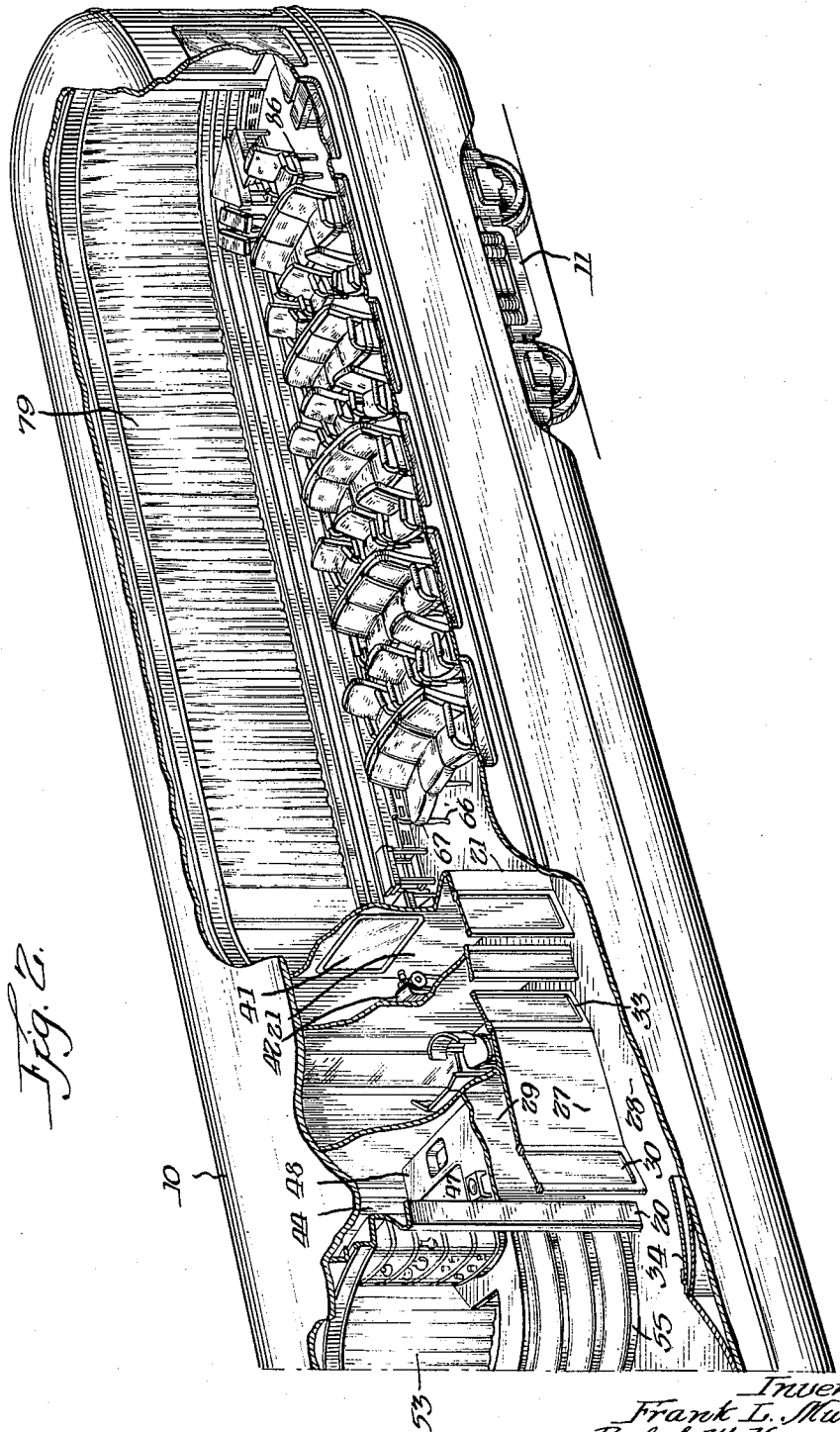

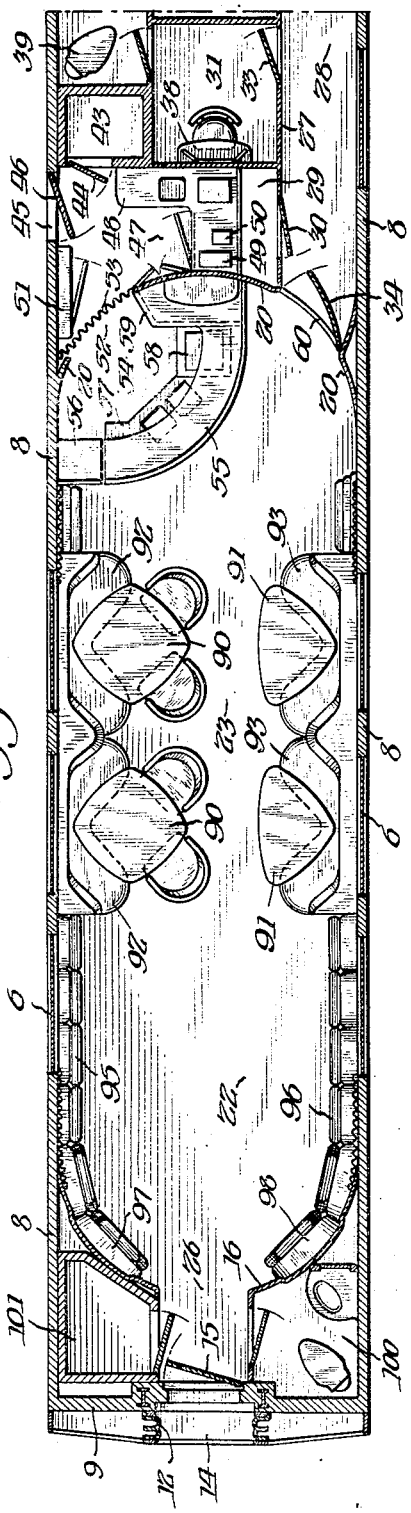

June 19, 1951   F. L. MURPHY ET AL   2,557,885
CONVERTIBLE RECREATION-LOUNGE VEHICLE
Filed Jan. 14, 1946   4 Sheets-Sheet 4
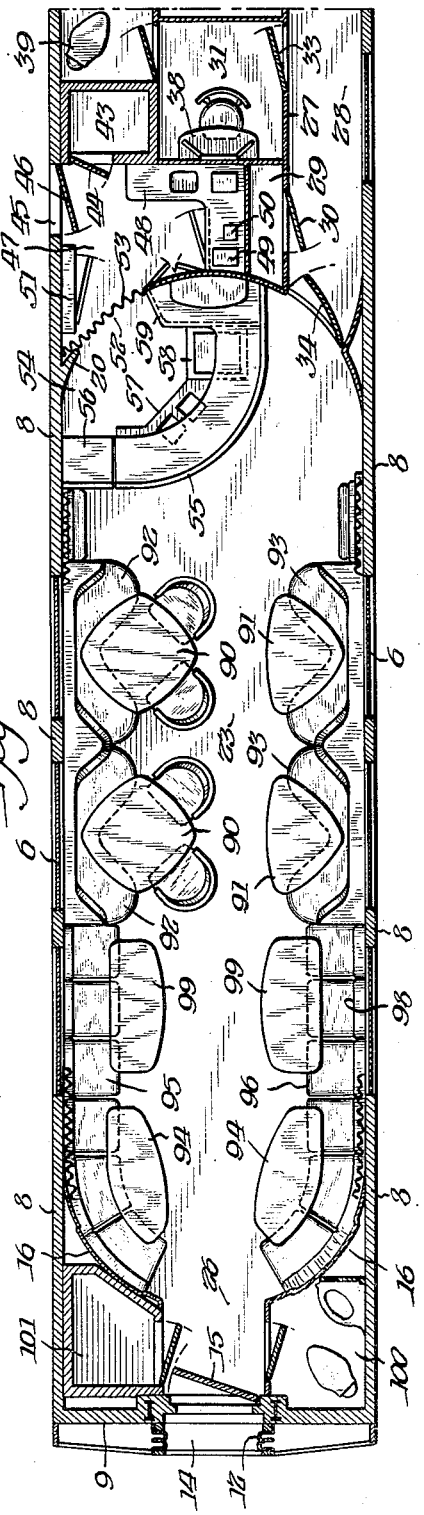
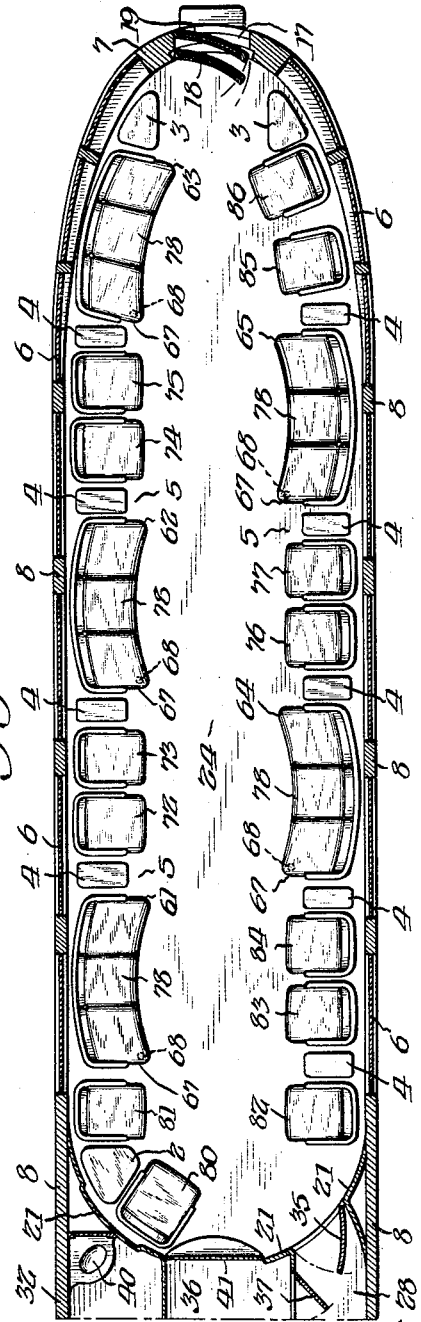
Inventors:
Frank L. Murphy,
Ralph W. Haman, &
Stanley W. Kay.
By Oscar Hochberg. Atty.

Patented June 19, 1951

2,557,885

UNITED STATES PATENT OFFICE 2,557,885

CONVERTIBLE RECREATION-LOUNGE VEHICLE

Frank L. Murphy, Chicago, Ralph W. Haman, Flossmoor, and Stanley W. Kay, Chicago, Ill., assignors to Pullman-Standard Car Manufacturing Company, Chicago, Ill., a corporation of Delaware Application January 14, 1946, Serial No. 641,130

6 Claims. (Cl. 105—344)

The invention relates to railway vehicles designed to provide observation lounge services during daylight travel periods and convertible to afford recreational facilities for passengers desiring them during night travel periods to avoid the tedium of extended or prolonged journeys, and to make available at all times refreshment services for the convenience of the occupants.

The principal object of the invention is to provide a vehicle designed normally to occupy the position of the end car in a train of passenger cars, and formed with a relatively flat face at the forward end for connection to adjoining cars of the train and a rounded rear end characteristic of observation type cars, fitted to provide refreshment service facilities, picture screen and projector room installation and adjacent toilet rooms disposed intermediate the ends of the car with dance floor and cocktail lounge sections forwardly of said intermediate installation and an auditorium section rearwardly of said installation, each of said sections being convertible to provide lounge observation car facilities.

A further and important object is to provide means for effecting conversion of the sections from one facility to the other independently of each other for use at the same time or at different times, and expeditiously, without interfering with the occupants of the other sections.

The foregoing and other objects of the invention are attained by the arrangement illustrated in the accompanying drawings, in which Figs. 1 and 2 are complemental views in perspective of the interior arrangement from end to end of the vehicle showing, respectively, the forward section arranged for dancing purposes with the cocktail lounge installation remaining undisturbed, and the rear section of the vehicle converted to provide an auditorium with the seats disposed to permit occupants to view the picture screen at the intermediate installation;

Figs. 3 and 4 are plan views representing, respectively, the arrangements depicted in Figs. 1 and 2, illustrating the facilities disposed for recreational purposes; and Figs. 5 and 6 are views in plan similar to Figs. 3 and 4, showing, respectively, the facilities arranged for normal observation-lounge services with cocktail lounge section left undisturbed.

In the drawings, 10 represents the vehicle body and 11 the supporting trucks. The car exterior at the forward end is provided with the usual diaphragm 12 about door opening 14 for access to adjoining car of the train, and an end door 15 closing the passageway. At the rear end the vehicle wall 7 is rounded, and provided with an exit opening 17 closed by inner and outer doors 18 and 19, respectively, preferably curved to the contour of the vehicle wall and to conform to the decorative treatment of the interior arrangement which, in the embodiment shown, includes generally, the curved intermediate partitions 20 and 21 extending transversely of the vehicle and separating the forward dancing and cocktail lounge sections 22 and 23, respectively, from the rear auditorium and lounge section 24, and the forward inner end wall portions 16 curved transversely of the vehicle and terminating at points spaced apart to provide passageway 26 to the end door 15 leading to adjoining cars of the train. The body end wall 9 carrying the diaphragm 12 and providing the end door opening 14, extends in a plane transversely of the vehicle to form the forward end of the car to unite the side walls 8 extending therefrom in parallel planes toward the rear of the car, there to curve inwardly and merge to form the rounded end wall 7, as best shown in Figs. 4 and 6. The side walls are provided each with an adequate number of windows 6 arranged at intervals adjacent the dancing, cocktail lounge, and auditorium sections 22, 23 and 24, respectively.

One phase of the invention features the means provided for the ready conversion of the interior fittings to provide one or the other of the recreational facilities afforded by the arrangement without disturbing the refreshment service installation and toilet facilities disposed intermediate the length of the car. As shown in Figs. 2 through 6, that portion of the intermediate installation between the forward curved partition 20 and the rear curved partition 21, includes also the longitudinal partition 27 extending in spaced parallel relationship with adjacent side wall 8 to define passageway 28 extending for the distance between said curved partitions. From this passageway, access may be had to electric locker 29 through door 30, to powder room 31 and toilet annex 32 through door 33, to cocktail lounge 23 through door 34, to auditorium section 24 through door 35, and to a projection room 36 through door 37. The powder room is fitted with a mirror-dresser set 38, and toilet annex equipped with hopper 39 and washbasin 40. The projection room 36 is fitted with a picture screen panel 41 mounted in the partition 21 forming one wall of the projection room and in position to be viewed by occupants of section 24 when the seats therein are so disposed as to convert that space from lounge to auditorium purposes during recreational periods. The projection room is further equipped with projector 42, which may be a motion picture machine, mounted as shown in Fig. 2, to cast its light beams upon the screen 41, which screen is made preferably of translucent material in order that the picture projected on the screen may be seen from the opposite or auditorium side of partition 21. Also within the installation space between the curved partitions 20 and 21 is housed the refreshment service equipment comprising refrigerator 43 with access door 44, occupying space between powder room 31 and adjacent car wall 8; supply opening 45 in said wall closed by door 46 as shown in Figs. 3 and 5; the kitchen 47 containing a worktable and sink 48, hot plate 49, toaster 50, and utility locker 51. A doorway 52 closed by curtain 53 in partition 20 provides communication between the kitchen and bar space 54. The bar 55 is fitted with the usual hinged bar top 56 at the wall 8 and equipped with sinks 57 and ice box 58, and rear bar and display shelves 59. The partition 20 extends in semicircular formation from one side wall 8 to the opposite wall as in the case of partition 21 and has also the door opening 60 to the side passageway 28.

The means provided for converting that portion of the vehicle between the semicircular partition 21 containing the picture screen 41 and rounded rear wall 7 for auditorium purposes, includes the series of multiple seat units 61, 62 and 63 arranged in spaced relationship along the wall 8 at one side of the space 24 and a lesser number of multiple seat units 64 and 65 at the opposite wall 8 and in similar relationship except that the multiple seat units thus disposed on one side of the space are staggered longitudinally with respect to the multiple seat units along the opposite wall 8, as best shown in Fig. 6. These units are proportioned as to length with respect to length of the auditorium space and the spaces 5 between them, for a purpose presently to appear, and proportioned as to width and shape with respect to the width of said auditorium space 24. As shown in Fig. 2, each one of these units is fitted with a supporting leg 66 at the front end corner 67 nearest the screen partition 21 and equipped with pivot pins 68 connecting the unit to the floor of the vehicle and about which point the unit may be turned to face the screen 41 transversely of the auditorium space in position to provide aisle passageways 69 of predetermined width between the walls 8 and respectively adjacent ends of said unit and transversely extending spaces 70 between adjacent units. When disposed normally for lounge purposes the multiple seat units remain secured to the floor by their respective pivot pins 68 in position to provide the spaces 5 between them, as shown in Fig. 6, to accommodate chairs 72 and 73 between the units 61 and 62, chairs 74 and 75 between units 62 and 63, and chairs 76 and 77 between units 64 and 65 on the opposite side of the lounge space. Upon shifting of the seat units transversely of the space 24, as shown in Figs. 2 and 4, the chairs 80, 81 and 82 are moved from their normal lounge position shown in Fig. 6 to the space 70 between seat units 61 and 64, as shown in Fig. 4 transversely of the floor; chairs 72, 83 and 84, are moved to space 70 between the seat units 64 and 62; chairs 73, 76 and 77 are moved to space 70 between the seat units 62 and 65; chairs 74, 75 and 85 are moved to the space 70 between the seat units 65 and 63; and chair 86 then moved to a position in back of the seat unit 63. The conversion is effected preferably in the order named to permit the shifting of the seat units in the alternating sequence stated and the placement of the chairs progressively behind the respective seat units as they are shifted to operative position transversely of the auditorium. The chairs are of a predetermined width designed to permit movement thereof along the aisle space 69 between the ends of the seat units and contiguous side walls 8 after the respective seat units have been moved about their pivots 68 and away from the walls to the positions shown in Figs. 2 and 4, and before restoration of said units to their respective side wall positions, as shown in Fig. 6.

Additional accessory equipment is provided in the form of end tables 4 arranged in the spaces 5 between the seat units and chairs at the ends of said units; and other tables 2 and 3 at forward and rear wall portions 21 and 7, respectively, and of triangular formation with table 2 having one of its sides curved to permit placement close to the curved partition 21, and tables 3 having one of their sides curved to the contour of rounded end wall 7 and designed for position at one end seat unit 63 and at one side of chair 86, all as shown in Fig. 6, with table 2 flanked by chairs 80 and 81 at the forward end of the section. The advantages inherent in the use of triangular tables 2 and 3 is emphasized when section 24 has been converted to auditorium purposes as shown in Figs. 2 and 4; in that arrangement it is important from the standpoint of safety and the comfort of the seat occupants that the side aisles 69 between the screen 41 and the rear of the section be kept clear of obstruction to allow free movement of occupants to and from the section. From an inspection of Fig. 4, it will be noted that tables 2 and 3 may remain undisturbed in their respective positions during conversion periods but the tables 4 flanking the sides of table 2 and one of the tables 3 may be disposed to keep from encroachment upon aisle 69 at that side of the section, and the tables 4 at one side of the table 3 on the opposite side of the section are also positioned to permit free access to passageway 28 from the rear of the section during recreational periods.

The cocktail lounge section 23 at the opposite end of the vehicle is arranged to provide refreshment to occupants seated at the fixed diagonally placed tables 90 at one side of the lounge and triangular tables 91 diagonally positioned at the opposite side of the lounge. The said tables 90 and 91 with associated seats 92 and 93, respectively, converging at adjacent side walls 8, are arranged in accordance with Patent No. 2,434,841, of January 20, 1948, covering Railway Dining Car. A part of this section forwardly of the fixed tables and seats to the forward curved wall portion 16 is fitted with a series of seats 95 and 96, arranged upon opposite sides of the forward end door 15, as best shown in Figs. 1, 3 and 5, along partition 16 and respective side walls 8 to fixed seat installations 92 and 93. Foldable tables 94, shaped to conform to position of seats 95 and 96 at the curved partition 16, are elongated as shown in Fig. 5 to serve that group of seats, and foldable tables 99, also elongated, serve the remainder of the respective rows of seats which continue in a straight line to adjacent fixed seat installations. These tables 94 and 99 may be removed and stored elsewhere temporarily during recreational periods. The seats 95 and 96 are foldable upwardly against their respective back portions 97 and 98 when floor section 22 of the cocktail lounge is desired for dancing purposes, as shown in Figs. 1 and 3. As shown in Figs. 1, 3 and 5, that portion of the vehicle between the forward curved partition 16 and end wall 9 contains a toilet room installation 100 on one side of the doorway 14, and a storage refrigerator 101 on the opposite side of said doorway.

It will be noted that there has been provided an interior arrangement designed to convert the installations assembled from their normal lounge and refreshment services to recreational exhibit room and dance floor purposes, and vice versa, without interruption of the refreshment service, and that such recreational facilities may be utilized independently of each other and made readily available. Conversion from one to the other of the services is effected simply and expeditiously in the manner and by the means described. The auditorium facilities are obtained by the mere rotation of the multiple seat units about their respective pivots 68 anchoring them to the floor. The units on opposite sides of the space are arranged in staggered relationship normally, so that when the seat unit 61 is turned clockwise about its pivot, unit 64 opposite may then be turned contra-clockwise as viewed in Fig. 6, to provide space 70 between them for the placement of chairs as shown in Fig. 4. The process is continued by the clockwise shifting of seat unit 62 and contra-clockwise turning of unit 65 opposite to a position behind unit 64 and finally, the clockwise rotation of seat unit 63 to a place behind unit 65, thereby to provide space between the respective units for additional rows of chairs. The seat units are preferably curved slightly, as shown at 78, to provide a more comfortable view of the screen 41. For conversion to normal lounge purposes the operations described are effected in reverse sequence. During exhibition periods the windows 6 may be covered by drapes 79 hung along the walls 8 and made adjustable to uncover the windows when desired. The conversion of the cocktail lounge section 23 to provide the dancing floor space 22 is effected by the mere raising of the wall seats 95 and 96 and the removal of the folding tables 94 and 99, as best shown in Figs. 1 and 3. Suitable drapes 89 may in like manner be hung along the side walls 8 of the cocktail lounge section to cover the windows 6 during recreational periods or at night. As will be obvious, the section 22 may be restored to normal cocktail lounge services by merely lowering the seats 95 and 96 and returning the tables 94 and 99 to their positions at the seats, as before the conversion. Means for conditioning the air of the vehicle interior is provided as indicated by the heating outlets 88 forming part of a general installation appropriate for equipment of the type described.

What is claimed is:

1. In a combination lounge and entertainment vehicle having a transverse partition separating at least a portion thereof from the rest of the vehicle and said portion convertible from a lounge section having longitudinally disposed seats at opposite sides of a central passage area to an entertainment auditorium having transversely disposed seats all facing said partition; a plurality of multiple seat units each pivot mounted at one corner thereof to the floor of the vehicle at respectively opposite sides of said central area substantially parallel to a longitudinal median line, a plurality of movable chairs disposed between said seat units at each side, said seat units at one side of the central area being arranged in staggered relation to the units at the opposite side and shiftable alternately therewith about said pivot mountings to positions extending transversely of the vehicle to provide rows of seats in spaced relationship, said chairs being movable to positions between said units to provide additional rows of seats, a longitudinal passageway extending along at least one side of the rows of seats substantially full length of the auditorium thus formed, and a picture screen panel in said partition.

2. In a combination lounge and entertainment vehicle having at least a portion thereof convertible from a lounge section having longitudinally disposed seats at opposite sides of a central passageway area to an entertainment auditorium having transversely disposed seats all facing in one direction; a plurality of multiple seat units each pivot mounted at one corner thereof to the floor of the vehicle at respectively opposite sides of said central area in facing relation to said area, said seat units at one side of the central area being arranged in staggered relation to the units at the opposite side and shiftable alternately therewith about said pivot mountings to positions extending transversely of the vehicle to provide rows of seats in spaced relationship, and a longitudinal passageway extending along at least one side of the rows of seats substantially full length of the auditorium thus formed.

3. In a combination lounge and entertainment vehicle having at least a portion thereof convertible from a lounge section having longitudinally disposed seats at opposite sides of a central passage area to an entertainment auditorium having transversely disposed seats all facing in one direction; a plurality of multiple seat units pivotally mounted at respectively opposite sides of said central area in facing relation to said area and staggered with respect to units at opposite sides and shiftable alternately to positions extending transversely of the vehicle to provide rows of seats in spaced relationship, said respective seat units each having a pivot mounting at a forward corner thereof to the floor of the vehicle to position the units when shifted thereabout in said central area and provide passageways at respectively opposite sides of the rows of seats extending substantially full length of the auditorium thus formed.

4. In a combination lounge and entertainment vehicle having a floor and a pair of side walls, a plurality of multiple seat units each having a front leg at one side of the unit mounted on the floor for turning movement about a vertical axis, with the unit disposed parallel and adjacent to a side wall and with the several units disposed in spaced staggered relation along the opposite side walls so that each unit is located opposite a side wall space unoccupied by a unit, whereby the units may be turned substantially 90° upon the respective named front legs thereof to positions in substantial parallelism with all the units extending in rows transversely of the vehicle and facing in the same direction.

5. The combination claimed in claim 4, in which certain of the named spaces unoccupied by units are occupied by chairs.

6. The combination claimed in claim 4, in which certain of the named spaces unoccupied by units are occupied by movable chairs and in which the units, when positioned transversely of the vehicle, are separated by spaces into which the chairs are movable to provide additional rows of seats.

FRANK L. MURPHY.
    RALPH W. HAMAN.
    STANLEY W. KAY.

REFERENCES CITED

The following references are of record in the file of this patent:

UNITED STATES PATENTS

| Number | Name | Date |
| --- | --- | --- |
| 89,537 | Pullman | Apr. 27, 1869 |
| 342,090 | Harris | May 18, 1886 |
| 761,785 | Rait | June 7, 1904 |
| 829,470 | Harris | Aug. 28, 1906 |
| 914,748 | Packard | Mar. 9, 1909 |
| 1,523,642 | Harvey | Jan. 20, 1925 |
| 2,141,864 | Harwood | Dec. 27, 1938 |